(12) United States Patent
Zhang

(10) Patent No.: US 11,083,262 B2
(45) Date of Patent: Aug. 10, 2021

(54) WEARABLE STORAGE CASE OPENING AND CLOSING BASED ON PRESS BUCKLE

(71) Applicant: Cytac Technology Limited, Shenzhen (CN)

(72) Inventor: Yong Zhang, Shenzhen (CN)

( * ) Notice: Subject to any disclaimer, the term of this patent is extended or adjusted under 35 U.S.C. 154(b) by 0 days.

(21) Appl. No.: 16/831,788

(22) Filed: Mar. 26, 2020

(65) Prior Publication Data

US 2020/0221840 A1 Jul. 16, 2020

(30) Foreign Application Priority Data

Dec. 13, 2019 (CN) .......................... 201911284475.7

(51) Int. Cl.
| | |
|---|---|
| *H04B 1/3888* | (2015.01) |
| *H04M 1/03* | (2006.01) |
| *A45C 11/00* | (2006.01) |
| *A45F 5/02* | (2006.01) |
| *H04B 1/3883* | (2015.01) |

(52) U.S. Cl.
CPC .............. *A45C 11/00* (2013.01); *A45F 5/021* (2013.01); *A45C 2011/002* (2013.01); *H04B 1/3883* (2013.01); *H04B 1/3888* (2013.01)

(58) Field of Classification Search
CPC . A45C 11/00; A45C 2011/002; A45C 13/123; A45C 15/00; A45C 13/002; A45F 5/021; A45F 2200/0516; H02J 7/0044; H04B 1/3883; H04B 1/3888; H04B 1/385; H04B 1/03; H04B 1/08; H04M 1/0283; H04M 1/185
See application file for complete search history.

(56) References Cited

U.S. PATENT DOCUMENTS

| | | | | | |
|---|---|---|---|---|---|
| 9,481,490 | B2 * | 11/2016 | Venida | ..................... | A45F 5/021 |
| 2005/0181745 | A1 * | 8/2005 | Wood | ..................... | H04M 1/605 |
| | | | | | 455/90.3 |
| 2006/0274493 | A1 * | 12/2006 | Richardson | ............ | H05K 5/068 |
| | | | | | 361/679.4 |
| 2012/0325882 | A1 * | 12/2012 | Tages | ...................... | A45F 5/021 |
| | | | | | 224/676 |
| 2014/0268519 | A1 * | 9/2014 | Huang | ................. | H04B 1/3888 |
| | | | | | 361/679.01 |
| 2017/0163305 | A1 * | 6/2017 | Bao | ...................... | H04B 1/3888 |
| 2018/0344004 | A1 * | 12/2018 | Kim | ...................... | B65D 51/24 |
| 2020/0297103 | A1 * | 9/2020 | Jang | ...................... | A45C 11/00 |

\* cited by examiner

*Primary Examiner* — Andrew Wendell

(57) ABSTRACT

The present disclosure provides a wearable storage case opening and closing based on press buckle. The wearable storage case opening and closing based on press buckle comprises a face shell, a bottom shell, a lid and a lid-shell connecting mechanism. The face shell has a sunken and hollow storage cavity and is equipped with a stepped engaging opening shrunk inwards the storage cavity, a press-buckle engaging protrusion protruded outwards the storage cavity and a lid connector having a guide-rail groove. The bottom shell is buckled on a face shell back side and equipped with a wearable mechanism. The lid is a shell which has a sunken and hollow storage cavity and matches with the stepped engaging opening in the face shell. A lid back side is equipped with two bulges protruded outwards.

10 Claims, 6 Drawing Sheets

WEARABLE STORAGE CASE OPENING AND CLOSING BASED ON PRESS BUCKLE

TECHNICAL FIELD

The present disclosure relates to the technical field of storage cases, and in particular to a wearable storage case opening and closing based on press buckle.

BACKGROUND

With the popularization of electronic products, various electronic products have become indispensable articles in people's life. They bring convenience to people's life and also increase carrying complexity. In most cases, people needs to singly carry a pouch for storing these electronic products. Mobile phone is one of these electronic products and can achieve various life functions such as mobile payment, transportation, entertainment and the like.

As the mobile phone is generally used, a storage case for the mobile phone also appears. However, the existing storage case for a mobile phone is only used for storing the mobile phone. In most cases, the storage case is thrown out as the rubbish or is putted aside as a useless article after the mobile phone is taken out of the storage case. Therefore, it is necessary to improve the utilization rate of the storage case for the mobile phone. In daily life, people with the mobile phone needs to frequently take out/put in the mobile phone, but if using a common storage case for the mobile phone, the mobile phone is inconvenient to take out or put in, and the storage case for the mobile phone further needs to be singly stored. Moreover, the existing storage case for the mobile phone is very inconvenient to be opened and closed, and the electronic products such as the mobile phone are inconvenient to take out and put in at any time. A common leather or polystyrene mobile phone pouch clips the mobile phone in a press buckle, hook-and-loop fastener or magnetic adsorption manner. When the mobile phone needs to be taken out, the press buckle or the hook-and-loop fastener needs to be released firstly, so the mobile phone is complex to take out and put in; only one side of a released buckle belt of the mobile phone pouch is fixed, and the other side thereof may affect the user, the magnetic adsorption manner needs to add a magnetic device to increase the structure complexity of the mobile phone pouch, so the user cannot quickly take out or put in the mobile phone. Furthermore, the user may carelessly release the press buckle or the hook-and-loop fastener when wearing the mobile phone pouch so as to influence the storage safety and stability of the mobile phone.

Therefore, it is an emergent technical problem how to provide a mobile phone storage case which can be conveniently and quickly mounted and detached and has high stability and safety in the prior art.

SUMMARY

An objective of the present disclosure is to provide a wearable storage case opening and closing based on press buckle to solve the technical problem that it is lack of a mobile phone storage case which can be conveniently and quickly mounted and detached and has high stability and safety in the prior art.

To achieve the above objective, the present disclosure provides a wearable storage case opening and closing based on press buckle, comprising a face shell, a bottom shell, a lid and a lid-shell connecting mechanism.

The face shell has a sunken and hollow storage cavity. A stepped engaging opening shrunk inwards the storage cavity is arranged at an opening of the storage cavity of the face shell. A face shell back side is equipped with a press-buckle engaging protrusion protruded outwards the storage cavity and a lid connector extending in parallel with an extending direction of the storage cavity. The lid connector has a guide-rail groove in parallel with the extending direction of the storage cavity.

The bottom shell is buckled on the face shell back side. A wearable mechanism is arranged on a bottom shell back side. The wearable mechanism comprises an L-shaped clip plate and a stop block. The clip plate is buckled on the bottom shell back side such that a wearable clip groove is formed between the clip plate and the bottom shell. The stop block is located at an opening of the wearable clip groove to form a U-shaped structure with the clip plate, and the U-shaped structure is buckled on the bottom shell back side to form a wearable through hole.

The lid is a shell which has a sunken and hollow storage cavity and matches with the stepped engaging opening in the face shell. The lid is buckled on the stepped engaging opening in the face shell to form a seal storage cavity with the face shell. A lid back side is equipped with two bulges protruded outwards the storage cavity and a dumbbell-shaped connecting rod corresponding to the guide-rail groove of the lid connector. A central rod of the dumbbell-shaped connecting rod penetrates through the lid and the guide-rail groove. The dumbbell-shaped connecting rod slides in the guide-rail groove to drive the lid to move close to/away from the face shell.

The lid-shell connecting mechanism comprises a press buckle, a connecting shaft and an elastic part. The press buckle is bent, and a bent part is equipped with press-buckle bugles with through holes. On the bent press buckle, a lower press-buckle plate corresponding to the press-buckle engaging protrusion is provided with an engaging claw, and the engaging claw matches with the press-buckle engaging protrusion. The connecting shaft penetrates through the through holes of the press-buckle bugles and the bulges of the lid. The elastic part matches with the connecting shaft and provides an elastic force back to the lid back side for an upper press-buckle plate of the bent press buckle.

Optionally, the wearable storage case opening and closing based on press buckle further comprises a battery and a socket control board.

The battery is located between the face shell and the back shell and is connected with the socket control board.

The socket control board is connected with the battery. A socket is arranged on the socket control board and penetrates through the face shell and then extends into the storage cavity of the face shell. An extending direction of the socket is opposite to an inserting direction of an article to be stored into the storage cavity.

Optionally, the wearable storage case opening and closing based on press buckle further comprises a power switch connected with the socket control board and used for controlling on and off of the socket.

Optionally, the wearable storage case opening and closing based on press buckle further comprises a charging port connected with the socket control board. The charging port faces outwards the face shell and can be connected with an external power supply to charge the battery.

Optionally, the wearable storage case opening and closing based on press buckle further comprises a dustproof plug. One end of the dustproof plug is a fixed end fixed to the face shell while the other end thereof is an elastic plug body matching with the charging port, and the fixed end is connected with the elastic plug body through an elastic strip.

Optionally, the L-shaped clip plate is provided with an upright slide groove, and a fastening hole corresponding to the slide groove is formed in the stop block. The stop block slides along the slide groove to adjust the width of the wearable through hole. A bolt penetrates through the slide groove and then is tightly screwed down in the fastening hole to fasten the stop block.

Optionally, the elastic part has an R-shaped bent elastic structure and comprises a supporting piece, an elastic piece mounting hole and an elastic piece. The supporting piece and the elastic piece are located on two sides of the elastic piece mounting hole. The elastic piece is mounted after the connecting shaft penetrates through the elastic piece mounting hole. The supporting piece is abutted on the face shell. The elastic piece is abutted on the press buckle.

Optionally, the press buckle engaging protrusion is a sloping raised line. A protrusion height of one side close to the lid is less than a protrusion height of a press-buckle engaging end.

Optionally, a locating and clamping slot is formed in an outer side of a front surface of the face shell and is located in a bottom end of the stepped engaging opening. A locating and inserting piece is arranged at the lid and matches with the locating and clamping slot. The locating and inserting piece is inserted into the locating and clamping slot to locate the buckling of the lid.

Optionally, a seal ring is arranged between the face shell and the lid and/or between the face shell and the bottom shell.

The wearable storage case opening and closing based on press buckle of the present disclosure achieves the following beneficial effects:

(1) According to the wearable storage case opening and closing based on press buckle of the present disclosure, an article such as a mobile phone and the like is stored by using the storage cavity. In use, the lid is opened, the mobile phone slides into the storage cavity through an opening of the face shell, then the lid is closed; at this time, the whole wearable storage case can be worn through a wearable structure. Therefore, the present disclosure safely stores an article to be stored, has high stability and ensures that the article to be stored can be conveniently and quickly taken out and putted in.

(2) According to the wearable storage case opening and closing based on press buckle of the present disclosure, in use, the lid is opened, the mobile phone slides into the storage cavity through the opening of the face shell and is connected with the socket at the bottom, the power switch at the back is pressed down, then the mobile phone can be charged. Therefore, the wearable storage case can charge electronic products such as the mobile phone and the like. The user experience is improved. The engagement of the lid is achieved by the matching of the elastic piece and the press buckle. Therefore, the wearable storage case has a simple structure, is easy to be produced and has high storage stability.

BRIEF DESCRIPTION OF THE DRAWINGS

To describe the technical solutions in the embodiments of the present disclosure or in the prior art more clearly, the following briefly describes the accompanying drawings required for describing the embodiments or the prior art. Apparently, the accompanying drawings in the following description show some embodiments of the present disclosure, and persons skilled in the art may still derive other drawings from these accompanying drawings.

DESCRIPTION OF THE EMBODIMENTS

The technical solutions of the embodiments of the present application are clearly and completely described below with reference to the accompanying drawings of the embodiments of the present application. Apparently, the described embodiments are some rather than all of the embodiments of the present application. All other embodiments obtained by persons skilled in the art based on the embodiments of the present disclosure without creative efforts shall fall within the protection scope of the present disclosure.

Embodiment 1

Figure 1:
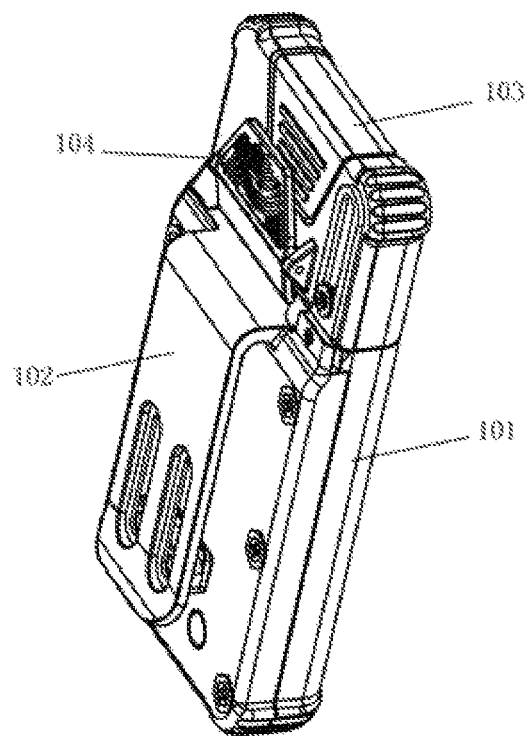
FIG. 1 is a schematic structural diagram of a wearable storage case opening and closing based on press buckle in an embodiment of the present disclosure.
Figure 2:
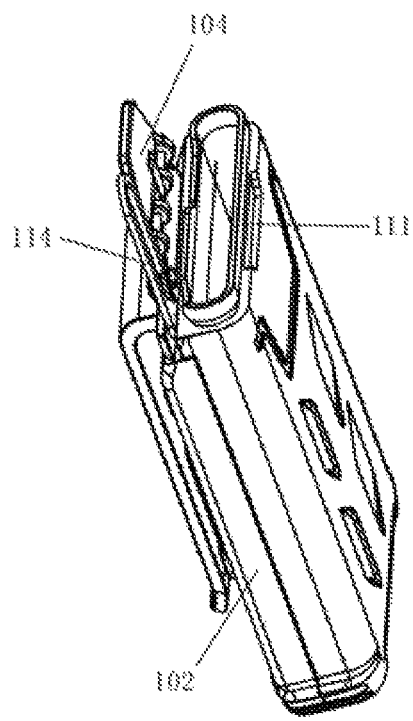
FIG. 2 is a schematic diagram showing connection of a face shell and a bottom shell in a wearable storage case opening and closing based on press buckle in an embodiment of the present disclosure.
Figure 3:
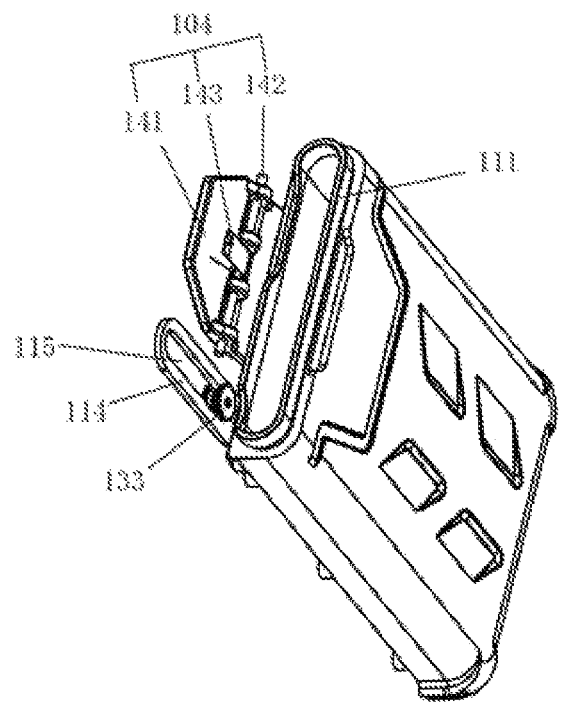
FIG. 3 is a schematic structural diagram of a face shell in a wearable storage case opening and closing based on press buckle in an embodiment of the present disclosure.
Figure 4:
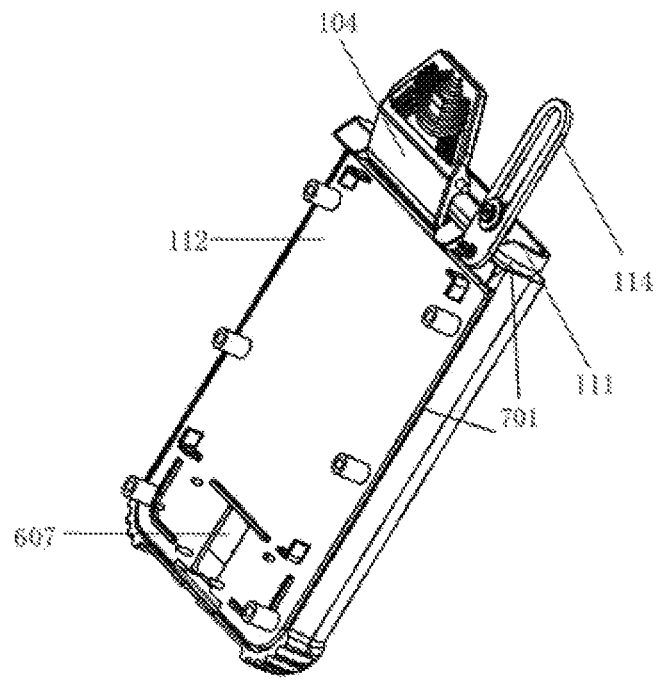
FIG. 4 is a schematic structural diagram of a back side of a face shell in a wearable storage case opening and closing based on press buckle in an embodiment of the present disclosure.
Figure 5:
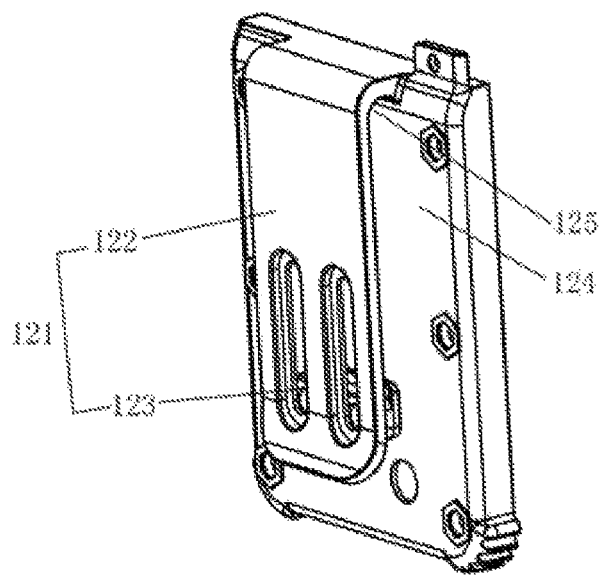
FIG. 5 is a schematic structural diagram of a bottom shell in a wearable storage case opening and closing based on press buckle in an embodiment of the present disclosure.
Figure 6:
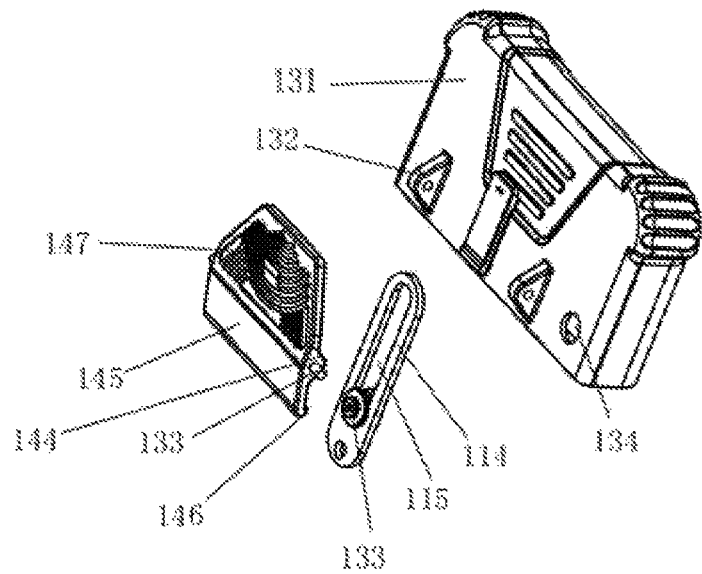
FIG. 6 is a schematic diagram showing a separated structure of a lid in a wearable storage case opening and closing based on press buckle in an embodiment of the present disclosure.
Figure 7:
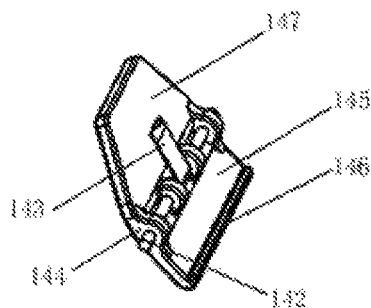
FIG. 7 is a schematic structural diagram of a lid-shell connecting mechanism in a wearable storage case opening and closing based on press buckle in an embodiment of the present disclosure.
Figure 8:
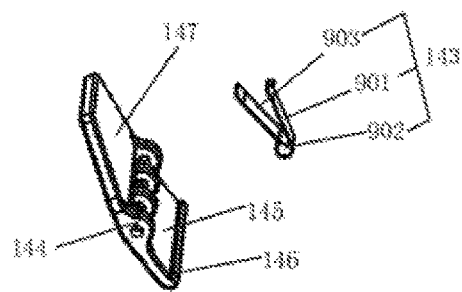
FIG. 8 is a schematic diagram showing a separated structure of a lid-shell connecting mechanism in a wearable storage case opening and closing based on press buckle in an embodiment of the present disclosure.
Figure 9:
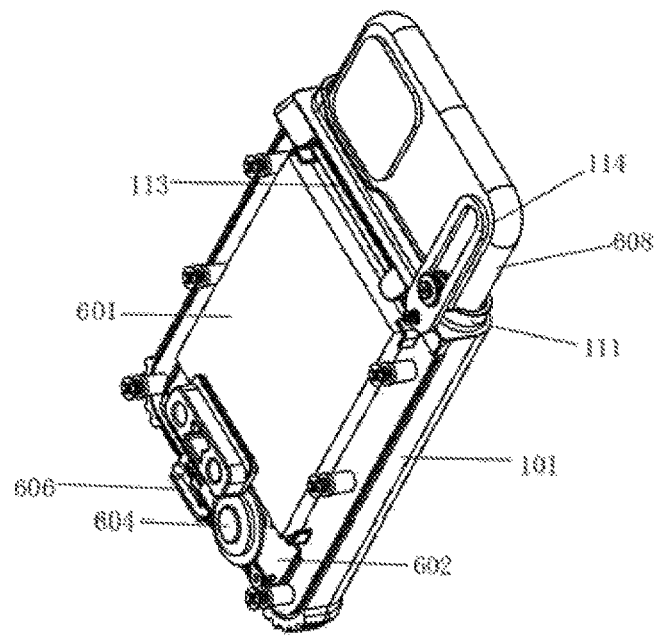
FIG. 9 is a schematic diagram when a mobile phone is stored in a face shell of a wearable storage case opening and closing based on press buckle in an embodiment of the present disclosure.
Figure 10:
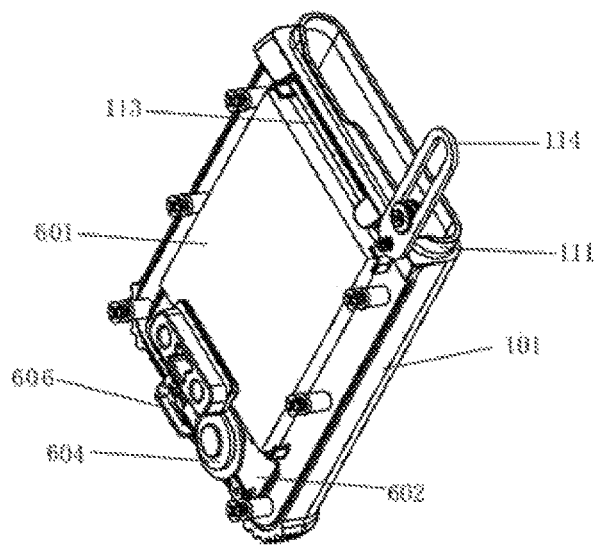
FIG. 10 is a schematic structural diagram of another face shell in a wearable storage case opening and closing based on press buckle in an embodiment of the present disclosure.
Figure 11:
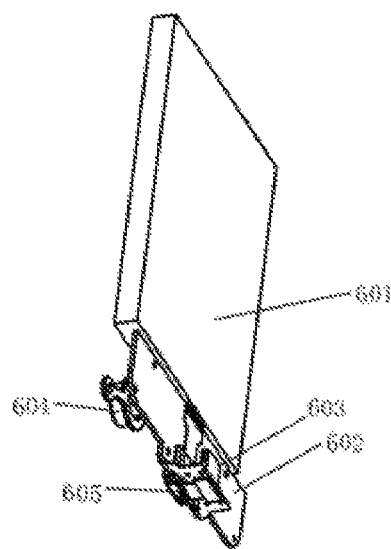
FIG. 11 is a schematic diagram showing connection of a battery and a socket control board in a wearable storage case opening and closing based on press buckle in an embodiment of the present disclosure.
Figure 12:
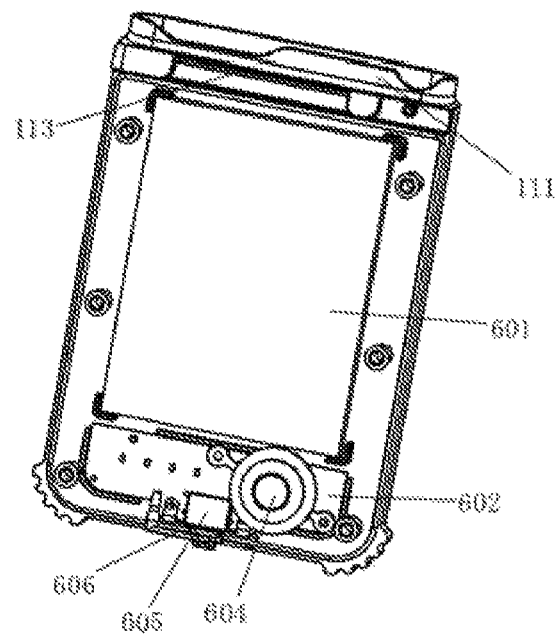
FIG. 12 is a schematic structural diagram of yet another face shell in a wearable storage case opening and closing based on press buckle in an embodiment of the present disclosure.
Figure 13:
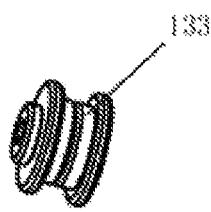
FIG. 13 is a schematic structural diagram of a dumbbell-shaped connecting rod in a wearable storage case opening and closing based on press buckle in an embodiment of the present disclosure.
Figure 14:
FIG. 14 is a schematic diagram showing a separated structure of a dumbbell-shaped connecting rod in a wearable storage case opening and closing based on press buckle in an embodiment of the present disclosure.

As shown in FIG. 1 to FIG. 14, FIG. 1 is a schematic structural diagram of a wearable storage case opening and closing based on press buckle in an embodiment of the present disclosure. FIG. 2 is a schematic diagram showing connection of a face shell and a bottom shell in a wearable storage case opening and closing based on press buckle in an embodiment of the present disclosure. FIG. 3 is a schematic structural diagram of a face shell in a wearable storage case opening and closing based on press buckle in an embodiment of the present disclosure. FIG. 4 is a schematic structural diagram of a back side of a face shell in a wearable storage case opening and closing based on press buckle in an embodiment of the present disclosure. FIG. 5 is a schematic structural diagram of a bottom shell in a wearable storage case opening and closing based on press buckle in an embodiment of the present disclosure. FIG. 6 is a schematic diagram showing a separated structure of a lid in a wearable storage case opening and closing based on press buckle in an embodiment of the present disclosure. FIG. 7 is a schematic structural diagram of a lid-shell connecting mechanism in a wearable storage case opening and closing based on press buckle in an embodiment of the present disclosure. FIG. 8 is a schematic diagram showing a separated structure of a lid-shell connecting mechanism in a wearable storage case opening and closing based on press buckle in an embodiment of the present disclosure. FIG. 9 is a schematic diagram when a mobile phone is stored in a face shell of a wearable storage case opening and closing based on press buckle in an embodiment of the present disclosure. FIG. 10 is a schematic structural diagram of another face shell in a wearable storage case opening and closing based on press buckle in an embodiment of the present disclosure. FIG. 11 is a schematic diagram showing connection of a battery and a socket control board in a wearable storage case opening and closing based on press buckle in an embodiment of the present disclosure. FIG. 12 is a schematic structural diagram of yet another face shell in a wearable storage case opening and closing based on press buckle in an embodiment of the present disclosure. FIG. 13 is a schematic structural diagram of a dumbbell-shaped connecting rod in a wearable storage case opening and closing based on press buckle in an embodiment of the present disclosure. FIG. 14 is a schematic diagram showing a separated structure of a dumbbell-shaped connecting rod in a wearable storage case opening and closing based on press buckle in an embodiment of the present disclosure.

Specifically, a wearable storage case opening and closing based on press buckle comprises a face shell 101, a bottom shell 102, a lid 103 and a lid-shell connecting mechanism 104. The face shell 101 has a sunken and hollow storage cavity capable of storing an electronic product such as a mobile phone and the like. A stepped engaging opening 111 shrunk inwards the storage cavity is arranged at an opening of the storage cavity of the face shell. A face shell back side 112 is equipped with a press-buckle engaging protrusion 113 protruded outwards the storage cavity and a lid connector 114 extending in parallel with an extending direction of the storage cavity. The lid connector 114 has a guide-rail groove 115 in parallel with the extending direction of the storage cavity.

Optionally, the press buckle engaging protrusion is a sloping raised line. A protrusion height of one side close to the lid is less than a protrusion height of a press-buckle engaging end. Therefore, a press buckle and the face shell can be conveniently and stably buckled such that the lid and the face shell are unlikely to release.

The bottom shell 102 is buckled on the face shell back side 112. The bottom shell may be provided with a sunken cavity extending backwards the face shell. The sunken cavity is used for storing articles including a battery, a socket control board (or a printed circuit board) and the like. A wearable mechanism 121 is arranged on a bottom shell back side. The wearable mechanism 121 comprises an L-shaped clip plate 122 and a stop block 123. The clip plate 122 is buckled on the bottom shell back side 124 such that a wearable clip groove is formed between the clip plate and the bottom shell. The stop block 123 is located at an opening of the wearable clip groove to form a U-shaped structure with the clip plate, and the U-shaped structure is buckled on the bottom shell back side to form a wearable through hole 125.

The lid 103 is a shell which has a sunken and hollow storage cavity and matches with the stepped engaging opening 111 in the face shell. The lid is buckled on the stepped engaging opening in the face shell to form a seal storage cavity with the face shell. A lid back side 131 is equipped with two bulges 132 protruded outwards the storage cavity and a dumbbell-shaped connecting rod 133 corresponding to the guide-rail groove of the lid connector. The dumbbell-shaped connecting rod has two flat ends and a small middle portion and has a dumbbell-shaped structure. The dumbbell-shaped connecting rod has a detachable assembly structure and comprises elements, two ends of which have large planar diameters, and a connector, the middle portion of which has a small diameter. A central rod of the dumbbell-shaped connecting rod penetrates through a rotation through hole 134 of the lid 103 and the guide-rail groove 115. The dumbbell-shaped connecting rod slides in the guide-rail groove to drive the lid to move close to/away from the face shell. The lid can rotate around the central rod of the dumbbell-shaped connecting rod. When the dumbbell-shaped connecting rod moves over the stepped engaging opening from the guide limit perforation of the lid connector, the lid is twisted and then can rotate around the dumbbell-shaped connecting rod, at this time, the storage case is opened.

The lid-shell connecting mechanism 104 comprises a press buckle 141, a connecting shaft 142 and an elastic part 143. The press buckle 141 is bent, and a bent part is equipped with press-buckle bugles 144 with through holes. On the bent press buckle, a lower press-buckle plate 145 corresponding to the press-buckle engaging protrusion is provided with an engaging claw 146, and the engaging claw 146 matches with the press-buckle engaging protrusion 113. The connecting shaft 142 penetrates through the through holes of the press-buckle bugles and the bulges 132 of the lid. The elastic part 143 matches with the connecting shaft 142 and provides an elastic force back to the lid back side for an upper press-buckle plate 147 of the bent press buckle.

In some optional embodiments, the wearable storage case opening and closing based on press buckle further comprises a battery 601 and a socket control board 602. The battery 601 is located between the face shell 101 and the back shell 102 and is connected with the socket control board 602. The socket control board 602 is connected with the battery 601. A socket 603 is arranged on the socket control board, penetrates through a through hole 607 of the face shell and then extends into the storage cavity of the face shell. An extending direction of the socket is opposite to an inserting direction of an article to be stored into the storage cavity. After an electronic product such as a mobile phone 608 slides into the storage cavity, a mobile phone charging port is connected with the socket 603, and after the battery is connected with the mobile phone, the mobile phone can be charged.

Optionally, the wearable storage case opening and closing based on press buckle further comprises a power switch 604 connected with the socket control board 602 and used for controlling on and off of the socket 603. After the mobile phone slides into the storage cavity of the storage case and is connected with the socket 603, the power switch 604 is pressed down such that a power supply is connected with the mobile phone and the mobile phone can be charged. A power switch seal ring can be further arranged between the power switch and a switch through hole of the bottom shell. A placing step for the power switch seal ring is arranged on an inner side of the bottom shell. A button of the power switch extends out of the shell after penetrating through the power switch seal ring and the switch through hole of the bottom shell, so the button is conveniently pressed.

Optionally, the wearable storage case opening and closing based on press buckle further comprises a charging port 605 connected with the socket control board 602. The charging port 605 faces outwards the face shell and can be connected with an external power supply to charge the battery 601. Further optionally, the wearable storage case opening and closing based on press buckle is provided with a wireless charging module. The wireless charging module can be connected with the charging port of the battery and transmits energy by using inductive coupling between an external wireless charger and the wireless charging module to charge the battery in a wireless manner.

Optionally, the wearable storage case opening and closing based on press buckle further comprises a dustproof plug 606. One end of the dustproof plug is a fixed end fixed to the face shell while the other end thereof is an elastic plug body matching with the charging port, and the fixed end is connected with the elastic plug body through an elastic strip.

Optionally, in the wearable storage case opening and closing based on press buckle, a seal ring 701 is respectively arranged between the face shell and the lid and/or between the face shell and the bottom shell to ensure the sealing property of the whole buckled storage case. A sunken groove may be formed in a mounting position of the seal ring of the face shell and is used for arranging the seal ring to prevent the seal ring from deforming or removing during mounting, which is beneficial to improving the sealing effect of the wearable storage case opening and closing based on press buckle.

The elastic part 143 has an R-shaped bent elastic structure and comprises a supporting piece 901, an elastic piece mounting hole 902 and an elastic piece 903. The supporting piece 901 and the elastic piece 903 are located on two sides of the elastic piece mounting hole 902. The elastic piece is mounted after the connecting shaft 142 penetrates through the elastic piece mounting hole. The supporting piece 901 is abutted n the face shell. The elastic piece 903 is abutted on the press buckle.

Although the preferred embodiments of the present disclosure have been described, persons skilled in the art can make additional changes and modifications to these embodiments once they learn the basic inventive concepts. Therefore, the appended claims are intended to be interpreted as including the preferred embodiments and all changes and modifications that fall within the scope of the present disclosure. Obviously, persons skilled in the art can make various modifications and variations to the present disclosure without departing from the spirit and scope of the present disclosure. In this way, if these modifications and variations of the present disclosure belong to the scope of the claims of the present disclosure and its equivalent technology, the present disclosure is intended to include these modifications and variations.

What is claimed is:

1. A wearable storage case opening and closing based on press buckle, comprising a face shell, a bottom shell, a lid and a lid-shell connecting mechanism, wherein the face shell has a sunken and hollow storage cavity; a stepped engaging opening shrunk inwards the storage cavity is arranged at an opening of the storage cavity of the face shell; a face shell back side is equipped with a press-buckle engaging protrusion protruded outwards the storage cavity and a lid connector extending in parallel with an extending direction of the storage cavity; the lid connector has a guide-rail groove in parallel with the extending direction of the storage cavity;

the bottom shell is buckled on the face shell back side; a wearable mechanism is arranged on a bottom shell back side; the wearable mechanism comprises an L-shaped clip plate and a stop block; the clip plate is buckled on the bottom shell back side such that a wearable clip groove is formed between the clip plate and the bottom shell; the stop block is located at an opening of the wearable clip groove to form a U-shaped structure with the clip plate, and the U-shaped structure is buckled on the bottom shell back side to form a wearable through hole;

the lid is a shell which has a sunken and hollow storage cavity and matches with the stepped engaging opening in the face shell; the lid is buckled on the stepped engaging opening in the face shell to form a seal storage cavity with the face shell; a lid back side is equipped with two bulges protruded outwards the storage cavity and a dumbbell-shaped connecting rod corresponding to the guide-rail groove of the lid connector, a central rod of the dumbbell-shaped connecting rod penetrates through the lid and the guide-rail groove; the dumbbell-shaped connecting rod slides in the guide-rail groove to drive the lid to move close to/away from the face shell;

the lid-shell connecting mechanism comprises a press buckle, a connecting shaft and an elastic part; the press buckle is bent, and a bent part is equipped with press-buckle bugles with through holes; on the bent press buckle, a lower press-buckle plate corresponding to the press-buckle engaging protrusion is provided with an engaging claw, and the engaging claw matches with the press-buckle engaging protrusion; the connecting shaft penetrates through the through holes of the press-buckle bugles and the bulges of the lid; the elastic part matches with the connecting shaft and provides an elastic force back to the lid back side for an upper press-buckle plate of the bent press buckle.

2. The wearable storage case opening and closing based on press buckle according to claim 1, further comprising a battery and a socket control board, wherein the battery is located between the face shell and the back shell and is connected with the socket control board;
the socket control board is connected with the battery; a socket is arranged on the socket control board and penetrates through the face shell and then extends into the storage cavity of the face shell; an extending direction of the socket is opposite to an inserting direction of an article to be stored into the storage cavity.

3. The wearable storage case opening and closing based on press buckle according to claim 2, further comprising a power switch connected with the socket control board and used for controlling on and off of the socket.

4. The wearable storage case opening and closing based on press buckle according to claim 2, further comprising a charging port connected with the socket control board, wherein the charging port faces outwards the face shell and can be connected with an external power supply to charge the battery.

5. The wearable storage case opening and closing based on press buckle according to claim 4, further comprising a dustproof plug, wherein one end of the dustproof plug is a fixed end fixed to the face shell while the other end thereof is an elastic plug body matching with the charging port, and the fixed end is connected with the elastic plug body through an elastic strip.

6. The wearable storage case opening and closing based on press buckle according to claim 1, wherein the L-shaped clip plate is provided with an upright slide groove, and a fastening hole corresponding to the slide groove is formed in the stop block; the stop block slides along the slide groove to adjust the width of the wearable through hole; a bolt penetrates through the slide groove and then is tightly screwed down in the fastening hole to fasten the stop block.

7. The wearable storage case opening and closing based on press buckle according to claim 1, wherein the elastic part has an R-shaped bent elastic structure and comprises a supporting piece, an elastic piece mounting hole and an elastic piece; the supporting piece and the elastic piece are located on two sides of the elastic piece mounting hole; the elastic piece is mounted after the connecting shaft penetrates through the elastic piece mounting hole; the supporting piece is abutted on the face shell; the elastic piece is abutted on the press buckle.

8. The wearable storage case opening and closing based on press buckle according to claim 1, wherein the press buckle engaging protrusion is a sloping raised line; a protrusion height of one side close to the lid is less than a protrusion height of a press-buckle engaging end.

9. The wearable storage case opening and closing based on press buckle according to claim 1, wherein a locating and clamping slot is formed in an outer side of a front surface of the face shell and is located in a bottom end of the stepped engaging opening; a locating and inserting piece is arranged at the lid and matches with the locating and clamping slot; the locating and inserting piece is inserted into the locating and clamping slot to locate the buckling of the lid.

10. The wearable storage case opening and closing based on press buckle according to claim 1, wherein a seal ring is arranged between the face shell and the lid and/or between the face shell and the bottom shell.

* * * * *